United States Patent
Hiersig et al.

[11] 3,958,465
[45] May 25, 1976

[54] DRIVING OF A SHAFT WITH PENDULUM MOUNT

[75] Inventors: Heinz M. Hiersig, Dusseldorf-Oberkassel; Wilhelm Schafer, Witten-Bommern; Bernd Schuhmann, Dortmund-Eichlinghofen; Max Thiemann, Herbede, all of Germany

[73] Assignee: Mannesmann Aktiengesellschaft, Dusseldorf, Germany

[22] Filed: Sept. 18, 1974

[21] Appl. No.: 507,053

[30] Foreign Application Priority Data
Sept. 18, 1973 Germany............................ 2347608

[52] U.S. Cl.................................. 74/801; 74/410; 74/665 A;
[51] Int. Cl.² ..................... F16H 1/28; F16H 57/00 F16H/37/06
[58] Field of Search ............ 74/801, 606, 409, 410, 74/411, 665 A, 665 B, 665 D, 665 E, 665 L, 665 M, 665 N, 665 P

[56] References Cited
UNITED STATES PATENTS

| | | | |
|---|---|---|---|
| 1,357,932 | 11/1920 | Hodgkinson | 74/410 |
| 3,196,714 | 7/1965 | Lundstrom | 74/410 X |
| 3,202,113 | 8/1965 | Love | 74/801 X |
| 3,438,462 | 4/1969 | Nelson | 74/801 X |
| 3,572,171 | 3/1971 | Larsson | 74/801 |
| 3,678,775 | 7/1972 | Danielsson | 74/410 |
| 3,839,922 | 10/1974 | Hiersig et al | 74/410 |

FOREIGN PATENTS OR APPLICATIONS 1,093,427 12/1967 United Kingdom ............... 74/665 P

*Primary Examiner*—Benjamin W. Wyche
*Assistant Examiner*—Lance W. Chandler
*Attorney, Agent, or Firm*—Ralf H. Siegemund

[57] ABSTRACT

A shaft carrying a cutter head is bolted to the output shaft of a speed reducer gear in coaxial configuration and having a casing journalled on the shaft. The casing carries plural drive motors and the gear has a combining stage as input. The shafts are mounted in thrust and pendulum bearings in a frame and the casing is held against rotation on that frame. The output stage of the gear is a planetary gear with a spider from which extends the output shaft and a hollow shaft and in opposite directions. The casing is journalled on the shaft by bearings engaging the hollow shaft and the output shaft at opposite sides of the spider.

14 Claims, 1 Drawing Figure

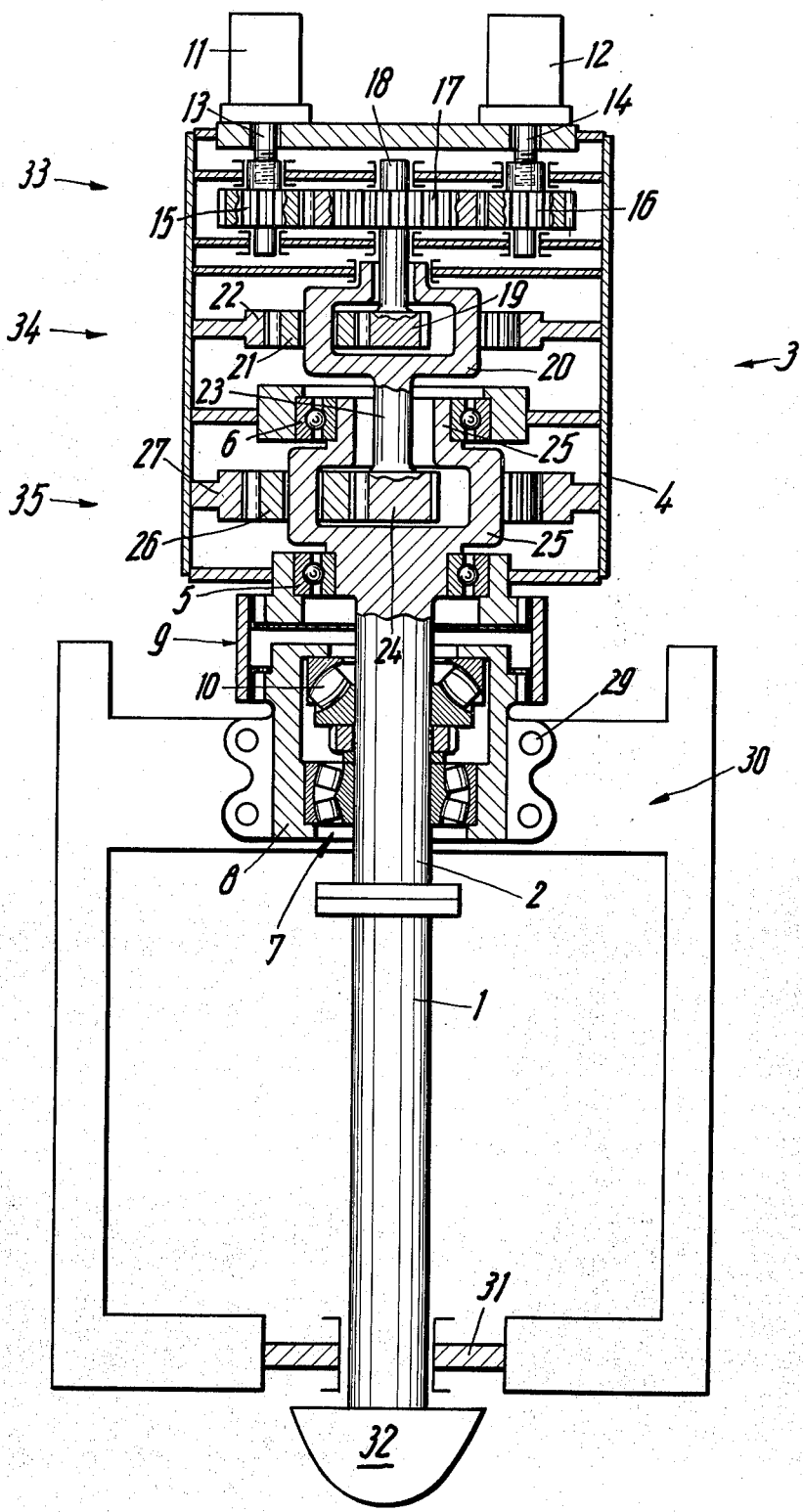

DRIVING OF A SHAFT WITH PENDULUM MOUNT

BACKGROUND OF THE INVENTION

The present invention relates to driving a shaft which is journalled and mounted in pendulum bearings, and more particularly the invention relates to a system which includes one or more drive motors or engines, a transmission and reducing gear with slow rotational output and driving a pendulum-mounted shaft at a low rate. The particular field and in which the problem solved by the invention arose, is the driving of suction dredge cutting heads, whereby such a head is secured to the end of such a pendulum mounted shaft while the other end connects to a driving train.

Drives for underwater cutting and drilling have been constructed in the past in drum configuration with thrust bearings to relieve the drive from axial thrust as exerted upon the cutter. In other words, the output axle of the gear was concentrically surrounded by one or multiple steps type speed reducers. The gear is particularly supported by a boom which is part of the dredge.

A particular coupling with cambered teeth is connected here between the thrust bearing and the gear. The thrust bearing takes up the axial forces acting on drive shaft, and the particular coupling compensates for any angular deflection between the axis of the output shaft of the gear on the one hand and the pendulum mounted shaft on the other hand and as may occur because the head shaft is usually additionally supported by highly elastic rubber bearings acting on the shaft close to the head.

The arrangements outlined above are satisfactory for engines or motors with large torques and small rotational speeds, and are particularly quite economical. This is particularly so as the reduction ratios are small and the gears have small diameters in these instances, (see for example, H. M. Hiersig in VDI-Zeitschrift 1965, Vo 6, pages 270 to 274 — Hydraulic drive of suction dredge cutting heads). The situation is quite different, if large torques are produced by many small, fast running drive motors. Plural reducing stages are needed here and the several drive channels have to be combined for obtaining a single rotary output. Consequently, some of the gears needed here will be quite large, and can be placed in and mounted to a dredge boom with great difficulties only.

SUMMARY OF THE INVENTION

It is an object of the present invention to solve the problems outlined above, particularly for driving a slowly rotating shaft which undergoes angular displacement.

It is another object of the present invention to provide for a compact construction for a drive shaft subjected to particular loads as resulting from angular displacement of the shaft.

It is a particular object of the present invention to improve the driving train for a rotary cutter particularly and, for example, for a cutter head of a suction dredge.

In accordance with the present invention, it is suggested to rigidly secure a pendulum mounted shaft to the output shaft of a gear, and the gear casing in turn is mounted on that output shaft by means of two bearings; furthermore, that casing is connected to the stationary part of the pendulum mount via a torque support to prevent rotation. In furtherance of the invention, plural drive units are secured to the bearing casings and follow any movement thereof. The entire drive assembly is, thus, journalled on the main shaft assembly. The main shaft is journalled in a frame via a pendulum mount and a thrust bearing having a common center, while the gear casing is held against rotation on the frame by a gear coupling with cambered teeth. The main shaft may additionally be journalled in the frame by a highly elastic bearing which, in the case the main shaft drives a cutter head, will be located right near that head. The casing will preferably contain a rotation combining gear and two cascaded planetary gears for speed reduction, whereby the main shaft extends from the spider of the output planetary gear, and the two gears for journalling the casing are disposed axially spaced apart and on opposite sides of that spider.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically a cross-section through an example for practicing the preferred embodiment of the present invention.

Proceeding now to the detailed description of the drawings, the FIGURE shows a shaft 1 carrying a cutter head 32 at its lower end. Reference numeral 3 refers to a reducing and combining gear 3 whose output shaft 2 is secured to shaft 1. Particularly a flange on shaft 1 is bolted to a corresponding flange on shaft 2 for obtaining a rigid connection between these two shafts.

A rigid connection is presented here as a flange to flange bolted connection of the two shafts 1 and 2. It is however, within the purview of the definition of a rigid connection that shafts 1 and 2 could be integral, i.e. one shaft. However, a single shaft is plainly impractical from standpoint of assembly and mounting, so that two interconnected shafts are the preferred form of practicing the invention.

Rotational input for the system is provided by a plurality of drive motors or engines, annularly arranged around the axis of shaft 2, two such drive motors, 11 and 12, can be seen in the drawings. The motors 11, 12 etc. have their respective housings secured to a casing 4 of of gear 3 and that casing 4 is journalled on shaft 2 by means of bearings 5.

The entire drive system is mounted to a frame 30, such as an outrigger or broom of a suction dredge.

A pendulum mount 7 or swing bearings for shaft 1 includes a stationary part 8 secured to dredge part or frame 30. Due to the rigid connection between shafts 1 and 2, mount 7 is, in fact, the pendulum or swing mount for shaft 1 even though the bearing portions of that mount engage directly shaft 2. Thrust bearings 10 are provided directly behind the pendulum bearing mount 7. The two bearings 7 and 10 have a common pendulum center. A highly resiliently yielding and elastic bearing 31 supports pendulum mounted shaft 1 in frame 30 adjacent to cutter head 32.

Thus, the dredge 30 supports the entire drive assembly for the cutting head 32 in that the rigidly interconnected shaft assembly 1, 2 is journalled on dredge 30 by means of bearings 7, 10, while shaft 2 supports casing 4 for the gear 3, serving also as mount for the motors 11, 12 etc.

Since the shaft 2 is inherently also journalled in the pendulum mount it follows all angular displacements of cutter shaft 1; and the entire drive system, including casing 4 with attachments, rides freely on that shaft 2, likewise following all angular, tilting displacements of shaft 1. These angular displacements should be specified as occurring in relation to bearing part 8 of the pendulum mount 7.

There is, however, provided an additional connection between frame 30 and casing 4, and that is a torque support 9 which holds the casing against rotation relative to frame 30. The torque support and rotation inhibitor 9 is established here by a gear-type coupling with cambered teeth. The coupling 9 is constructed as gear sleeve coupling, having a first gear-like coupling element integral with bearing part 8 as secured to frame 30 and being stationary therewith. The casing 4 has a similar coaxial gear-like element and a sleeve with internal ring gears interconnects these gear elements. At least some of the gear teeth are cambered. This way, lateral displacement between casing 4 and frame 3 can be taken up without binding or release from the holding action as provided therewith to casing 4 preventing its rotation. Since the entire unit operates under water, the gear coupling is constructed to provide also a sealing function.

The gear 3 in casing 4 has a rotation summing or combining stage 33 for combining the plural inputs from the motors in a common output. A first planetary gear 34 is driven by stage 33, and a second planetary gear 35 is driven by the stage established by gear 34. Planetary gear 35 is the output stage and drives shaft 2.

Turning to particulars of the gear train, the motors 11, 12 etc. respectively have output shafts 13, 14 etc. for driving directly pinions 15, 16 all meshing a gear 17 which, thus, is driven by all of the motors and established a common output. The gear 17 and pinions 15, 16 and others establish the input stage 33 of gear 3.

Gear 17 is coaxial to shaft 2 and sits on a shaft 18 which is driven accordingly; shaft 18 in turn carries the sun wheel 19 of planetary gear 34. Planet gears 21 mesh with and are driven by gear 19. These gears 21 are journalled in a spider or carrier 20 of this planetary gear. The planet gears additionally mesh annular or internal ring gear 22. Carrier 20 drives shaft 23 which interconnects stages 34 and 35. Gear 22 is secured to the inside wall of casing 4.

Shaft 23 carrries the sun gear 24 of output stage 35, meshing with planet gears 26 which also mesh in annular or internal ring gear 27 also secured to casing 4. Gears 26 are journalled in spider or carrier 25 from which extends shaft 2. Additionally, a hollow tube 28 extends from spider 25 in the opposite direction and by means of which a second bearing support, 6, is provided for casing 4. This second bearing 6 is thus interposed between a bearing carrier in casing 4 and hollow shaft 28. Since shaft 28 is integral with or secured to shaft 2, the latter indeed, supports casing 4 by means of the two bearings, 5 and 6.

It can thus be seen that a rather compact reduction gearing is provided by means of several cascaded gears, whereby the input stage combines plural rotary inputs and a coaxial arrangement prevails throughout. Angular deflections are not taken up by gear 3; rather the entire gear train with housing follows such deflection, including even the several individual motors.

The invention can be practiced in other cases and where the object is to drive a shaft rather slowly, which may undergo some angular deflection caused by disturbances from the outside. This includes angular deflection caused by internal twisting of the frame 30. As the boom of a dredge may undergo such twisting application of the invention to the journalling of the cutter head in the dredge is particularly advantageous. It is important here that gear 3 and associated parts are not directly secured to dredge 30.

The invention is not limited to the embodiments described above all changes and modifications thereof not constituting departures from the spirit and scope of the invention are intended to be included.

We claim:

1. Apparatus for driving a shaft at a low speed and in relation to a frame, support or the like comprising;
    a reducing gear having a casing and at least one input shaft and one output shaft, the output shaft being rigidly secured to the shaft to be driven;
    a pair of axially spaced bearings journalling the casing on the output shaft;
    a pendulum or swing bearing for journalling the interconnected output and driven shafts on the frame;
    means interconnecting the frame and the casing without preventing pendulum motion of the latter relative to the former, for inhibiting rotation of the casing relative to the frame; and
    a drive motor connected to the input shaft.

2. Apparatus as in claim 1, there being a plurality of drive motors including said drive motor and a plurality of input shafts including said one input shaft respectively connected to the drive motors of the plurality of drive motors, the motors being mounted on the casing, the gearing including a rotation combining stage.

3. Apparatus as in claim 1, and including at least one planetary gear in the reducing gear having a spider on a hollow shaft traversed by an input shaft for the one planetary gear and coupled to the motor, the output shaft extending from the spider and in opposite direction as the hollow shaft, the bearings of the pair respectively journalling the output shaft and the hollow shaft.

4. Apparatus as in claim 3, including a second planetary gear coupled to the motor and driving the said one input shaft, to obtain two state speed reduction.

5. Apparatus as in claim 1, wherein the means for inhibiting rotation is a gear coupling with cambered teeth.

6. Apparatus as in claim 5, wherein the coupling is a gear sleeve coupling including a first gear on the frame, a second gear normally coaxial with the first gear and mounted on the casing, and a sleeve with teeth engaging both said first and second gears, at least some of the teeth of said first and second gears and of the sleeve being cambered.

7. Apparatus as in claim 1, said output shaft extending from the casing, the pendulum bearing engaging the said output shaft where the output shaft extends from the casing.

8. Apparatus as in claim 7, and including a thrust bearing for journalling the output shaft and having a common center with the pendulum bearing.

9. Apparatus for driving a shaft at a low speed and in relation to a frame, support or the like comprising:
    a reducing gear having a casing, a plurality of input shafts, and an output shaft being rigidly secured to the shaft to be driven, the gear providing for combining or rotation of the input shafts and speed reduction for low speed rotation of the output shaft;

a plurality of motors secured to the casing and drivingly connected to the input shafts;

a pair of bearings journalling the casing on the output shaft;

a pendulum or swing bearing for journalling the shafts on the frame; and means interconnecting the frame and the casing without preventing pendulum notion of the latter relative to the former, for inhibiting rotation of the casing relative to the frame.

10. Apparatus as in claim 9, wherein the gear includes a combining stage with output coaxial to said output shaft, and at least one planetary gear connected to the combining stage and having a spider from which extends the output shaft, as well as a hollow shaft, the two gears respectively engaging the output shaft and the hollow shaft, the latter being rigidly connected to the former through the spider.

11. Apparatus as in claim 10 and including a second planetary gearing connected between the combining stage and the one planetary gearing, the second gearing having a output shaft traversing the hollow shaft and supporting a sun wheel of the one planetary gearing.

12. Apparatus as in claim 11, each planetary gearing having an annular gear respectively secured to the inside of the casing.

13. Apparatus as in claim 9, wherein the gear includes a combining stage having a plurality of pinions respectively driven by the motors of the plurality and a common gear meshing with all said pinions, and at least one planetary gear for speed reduction, coupled to said output shaft and being driven by said common gear.

14. Apparatus as in claim 9, the shaft to be driven carrying a cutter head, the latter shaft being additionally supported in the frame by a highly elastic bearing, the frame being part of a dredge.

* * * * *